(12) United States Patent
Bosquet et al.

(10) Patent No.: US 9,668,408 B2
(45) Date of Patent: Jun. 6, 2017

(54) KNIFE DRIVE CLEANING APPARATUS FOR A HEADER OF AN AGRICULTURAL HARVESTER

(71) Applicant: CNH Industrial America LLC, New Holland, PA (US)

(72) Inventors: Antonio Carlos Bosquet, Parana (BR); Rodrigo Mayer de Avila, Curitiba (BZ)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/489,950

(22) Filed: Sep. 18, 2014

(65) Prior Publication Data
US 2016/0081266 A1 Mar. 24, 2016

(51) Int. Cl.
*A01D 34/40* (2006.01)
*A01D 57/10* (2006.01)

(52) U.S. Cl.
CPC .............. *A01D 34/40* (2013.01); *A01D 57/10* (2013.01)

(58) Field of Classification Search
CPC ....... A01D 34/003; A01D 34/40; A01D 57/10
USPC .................................................. 56/12.8, 12.9
See application file for complete search history.

(56) References Cited

U.S. PATENT DOCUMENTS

| | | | |
|---|---|---|---|
| 689,800 A | 12/1901 | Hafermehl | |
| 859,602 A | 7/1907 | Green | |
| 2,670,586 A | 3/1954 | Phillips | |
| 2,718,744 A | 9/1955 | Phillips | |
| 2,737,006 A | 3/1956 | Klingler | |
| 3,555,790 A * | 1/1971 | Quick | A01F 12/10 460/16 |
| 4,303,373 A * | 12/1981 | Polhemus | A01D 45/30 415/206 |
| 4,406,112 A | 9/1983 | Brooks | |
| 4,730,444 A * | 3/1988 | Leffel | A01D 45/30 56/12.9 |
| 4,864,806 A * | 9/1989 | Mijnders | A01D 34/667 56/12.8 |
| 4,866,919 A * | 9/1989 | Brooks | A01D 57/10 56/12.9 |
| 4,909,025 A * | 3/1990 | Reissig | A01D 34/305 56/257 |
| 4,914,896 A * | 4/1990 | Gullickson | A01D 57/10 56/12.9 |
| 4,936,082 A * | 6/1990 | Majkrzak | A01D 57/10 56/220 |
| 5,129,216 A * | 7/1992 | Gullickson | A01D 57/10 56/12.9 |
| 5,450,716 A * | 9/1995 | Gidge | A01D 46/005 56/12.8 |
| 7,591,127 B1 | 9/2009 | Stacer et al. | |
| 7,810,304 B2 * | 10/2010 | Priepke | A01D 34/30 56/257 |

(Continued)

*Primary Examiner* — John G Weiss
(74) *Attorney, Agent, or Firm* — Patrick M. Sheldrake (57) ABSTRACT

A cutterbar knife drive cleaning apparatus for a header of an agricultural harvester is disclosed. The apparatus cleans the knife drives by discharging pressurized air from an apertured conduit toward the knife drive. Movement of a cutterbar supporting arm causes rotation of the conduit to produce a sweeping action of an air curtain over the knife drive in order to blow dirt and debris from the knife drive as the harvester traverses a field.

17 Claims, 6 Drawing Sheets

(56) References Cited

U.S. PATENT DOCUMENTS

| | | | |
|---|---|---|---|
| 7,870,713 B2* | 1/2011 | Schroeder | A01D 57/10 56/12.8 |
| 8,151,547 B2 | 4/2012 | Bich et al. | |
| 2011/0099964 A1* | 5/2011 | Coers | A01D 34/30 56/296 |

* cited by examiner

KNIFE DRIVE CLEANING APPARATUS FOR A HEADER OF AN AGRICULTURAL HARVESTER

BACKGROUND

The subject application relates generally to a header for use with agricultural harvesters. In particular, the subject application relates to an apparatus for clearing debris from a knife drive of a header for an agricultural harvester using pressurized air as the cleaning medium.

Sickles, typically including cutterbars supporting a row of knives, have been used to cut plants including, but not limited to, hay, grasses, small grains and the like for many years. In conventional harvester equipment the knives are constructed as a plurality of knife or sickle sections which are mounted in side-by-side relation forming an elongate metal knife assembly or cutterbar. The knife assembly is normally supported so as to slide longitudinally along an elongate stationary bar that has forwardly projecting, spaced apart guards that are bolted to a structural beam or knife back. The knife assembly moves back and forth in reciprocating motion to move the knives relative to the guards so that the leading knife edges cross over the guards or move through slots in the guards. This motion produces a shearing or cutting action which severs plant stems or stalks or other material that becomes captured between the knives and the guards.

In a harvesting machine such as a combine, a pair of such cutterbars and stationary bars are typically supported in connection with a cutting head or header and are oriented so as to extend laterally or widthwise along a forward edge portion of structure such as a floor or pan of the header. The floor or pan defines the lower extent of a cut crop or plant flow area, which can include conveying apparatus such as one or more augers or belts. The conveying apparatus is oftentimes operable in cooperation with a harvesting reel for conveying the cut plant material to a feederhouse inlet of the combine.

The pair of cutterbars can be driven by one or two centrally located knife drives which derive their power from power take offs operatively connected to the combine. A problem with the knife drives is that, because of their location in or below the header floor or pan, the drives are at least partially contained in a relatively low profile or flat housing or cover upon which loose crop material and other undesirable material such as dust, dirt and debris can accumulate. This situation is disadvantageous because, if allowed to accumulate, such material can quickly insulate the drive and reduce dissipation of heat generated by operation of the knife drives. The result can be overheating and premature failure of knife drive components.

In addition, accumulated material can become lodged between the knife drives and the underside of the floor or pan and can even become compacted into a solid mass which limits or prevents upward movement of the knife drive during operation. This can be problematic, for instance, if the drive is used with a cutterbar or sickle that can flex upwardly or when the cutterbar is configured to float so as to be movable upwardly toward the header floor or pan. Failure of the cutterbar to flex or move fully upwardly may result in the cutterbar becoming immersed in the soil rather than severing crop close to the ground surface which can result in damage to the cutterbar and/or the knife drive. Another problem is that some crop can pass through knife support arm openings provided in the header floor or pan and go unharvested by the header.

BRIEF SUMMARY

In accordance with a first aspect, the subject application provides an agricultural harvester including a source of pressurized air and a header. The header includes a knife drive mounted rearwardly of a cutterbar assembly, and a conduit disposed proximate the knife drive and rearwardly of the cutterbar assembly. The conduit is in fluid communication with the source of pressurized air and includes at least one opening for discharging pressurized air towards the knife drive.

In accordance with a second aspect, the subject application provides a header for an agricultural harvester. The header includes a chassis and a flex arm extending from the chassis movable between a first position and a second position. The header further includes a knife drive supported by the chassis and a conduit disposed proximate the knife drive. The conduit includes at least one opening for discharging pressurized air toward the knife drive and the conduit is operatively connected to the flex arm to move between first and second positions in response to the flex arm moving between its first and second positions.

In accordance with a third aspect, the subject application provides an apparatus for cleaning a knife drive of a header for an agricultural harvester. The header includes a chassis and a cutterbar supporting arm movably connected to the chassis. The apparatus includes a pressurized air source carried by at least one of the header and the agricultural harvester and a conduit disposed proximate the knife drive. The conduit is in fluid communication with the pressurized air source and includes an opening for discharging a curtain of air toward the knife drive. The conduit is also configured to pivot about an axis in response to movement of the cutterbar supporting arm thereby sweeping the curtain of air across a top surface of the knife drive.

In accordance with a fourth aspect, the subject application provides a method for clearing debris from a knife drive of a header for an agricultural harvester. The header includes a chassis and a cutterbar supporting arm movably connected to the chassis. The method includes the act of providing a sweeping flow of pressurized air across a top surface of the knife drive as the harvester is operated in a harvesting mode.

In accordance with a fifth aspect, the subject application provides a system for preventing material build-up between the floor and the knife drive of a header for an agricultural harvester. The system includes a source of pressurized air carried by either or both of the header and the harvester and an apertured tube or conduit located adjacent the header floor and proximate the knife drive for discharging pressurized air toward the knife drive. A valve is in fluid communication with the source of pressurized air and the conduit and operates to permit flow of pressurized air from the air source to the conduit for discharge toward the cutterbar knife drive. A valve actuator including a controller is operatively connected to the valve to cause opening and closing of the valve. The valve actuator can operate pursuant to a programmed duty cycle. Floating movement of a cutterbar support arm or flex arm is translated into rotational movement of the apertured tube which results in a curtain of pressurized air being swept across the knife drive to remove dirt, dust, crop material and other debris from the knife drive during operation of the harvester. The result is a knife drive whose output shaft openings and breather valve are kept essentially free of undesirable matter which might clog and cause damage to the knife drive as well as inhibit full range of motion of the cutterbar in relation to the ground surface of the field being harvested.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
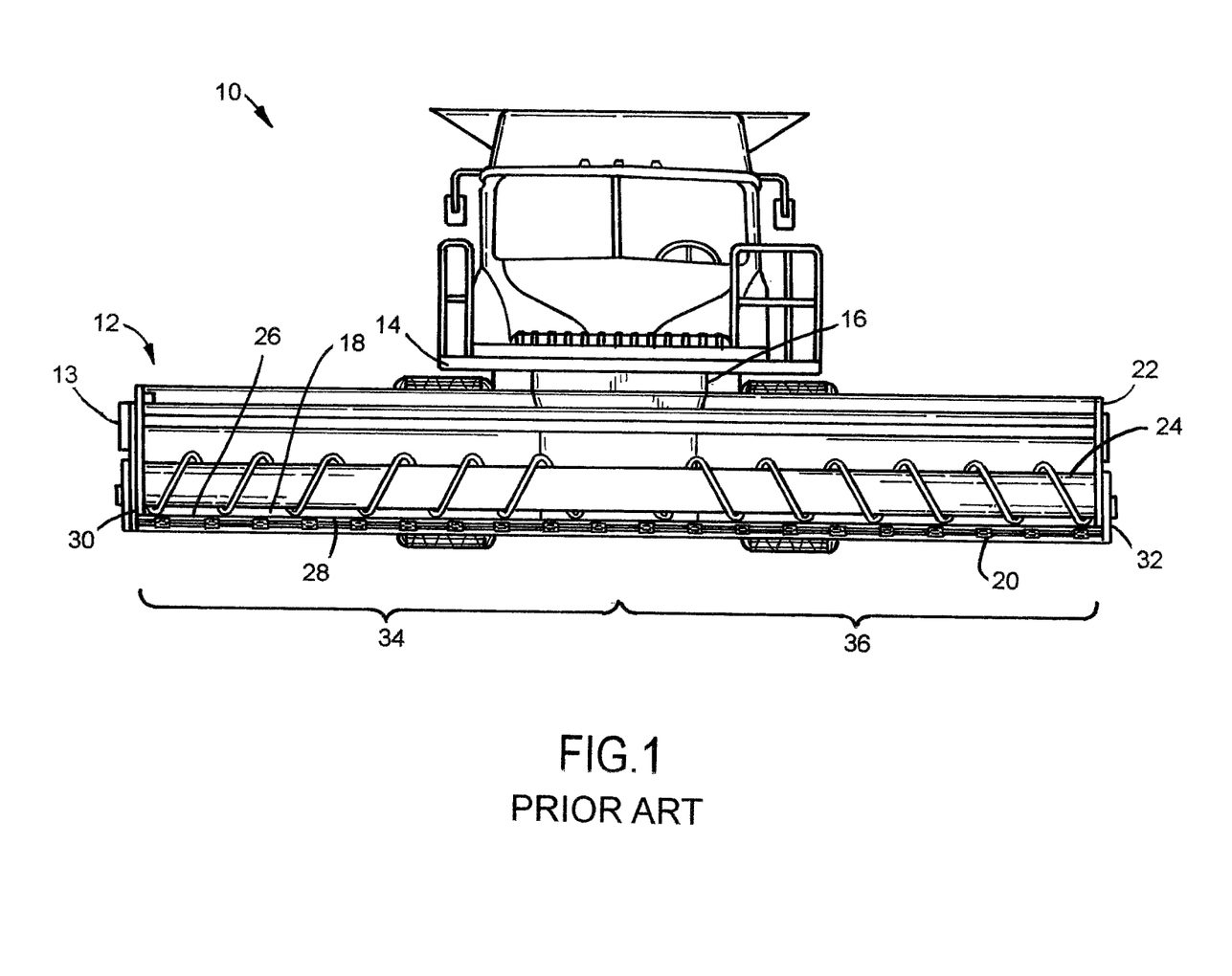
FIG. 1 is a front elevation view of a conventional agricultural harvester including a header.

Referring now to the drawings wherein aspects of the subject application are shown, FIG. 1 illustrates an agricultural harvester 10 such as a combine. Harvester 10 includes a header 12 including a chassis or frame 13 which is attached to a forward end 14 of the harvester. Header 12 is configured to cut crops and to induct the cut crops into a feederhouse 16 as harvester 10 moves forward over a crop field.

Header 12 further includes a floor 18 that is supported in desired proximity to the surface of a crop field and an elongate sickle or cutterbar assembly 20 that extends transversely adjacent a forward edge of the floor 18. Cutterbar assembly 20 is configured to cut crops in preparation for induction into the feederhouse 16. Additionally, header 12 includes an elongate, transversely extending harvesting reel 22 disposed above cutterbar 20. Harvesting reel 22 is rotatable in a direction suitable for facilitating the induction of cut crops into feederhouse 16. Header 12 further includes an elongate, rotatable auger 24 which extends in close proximity to a top surface 26 of floor 18. Auger 24 is configured to cooperate with harvesting reel 22 in conveying cut crops to feederhouse 16, which is configured to convey the cut crops into harvester 10 for threshing and cleaning. While FIG. 1 illustrates a header including an auger conveyor system, it will be understood that the header may alternatively be configured as any other conventional header types and e.g., include a draper conveyor system or any combination of auger, draper or other conveyor system that may be suitable for conveying cut crop material to feederhouse 16.

Cutterbar assembly 20 extends along or adjacent a forward edge 28 of floor 18, and generally is bounded by a first side edge 30 and an opposing second side edge 32 of floor 18. Cutterbar assembly 20 can be configured to include a first reciprocating knife assembly 34 and a second reciprocating knife assembly 36 (along with an unillustrated stationary knife). The reciprocating mechanisms of such knife assemblies are known in the art and a further detailed description of their structure, function and operation is not necessary for a complete understanding of the subject application. However, a typical reciprocating mechanism applicable to the knife assembly of the subject application is disclosed in U.S. Pat. No. 8,151,547, the entire disclosure of which is incorporated by reference herein.

Figure 2:
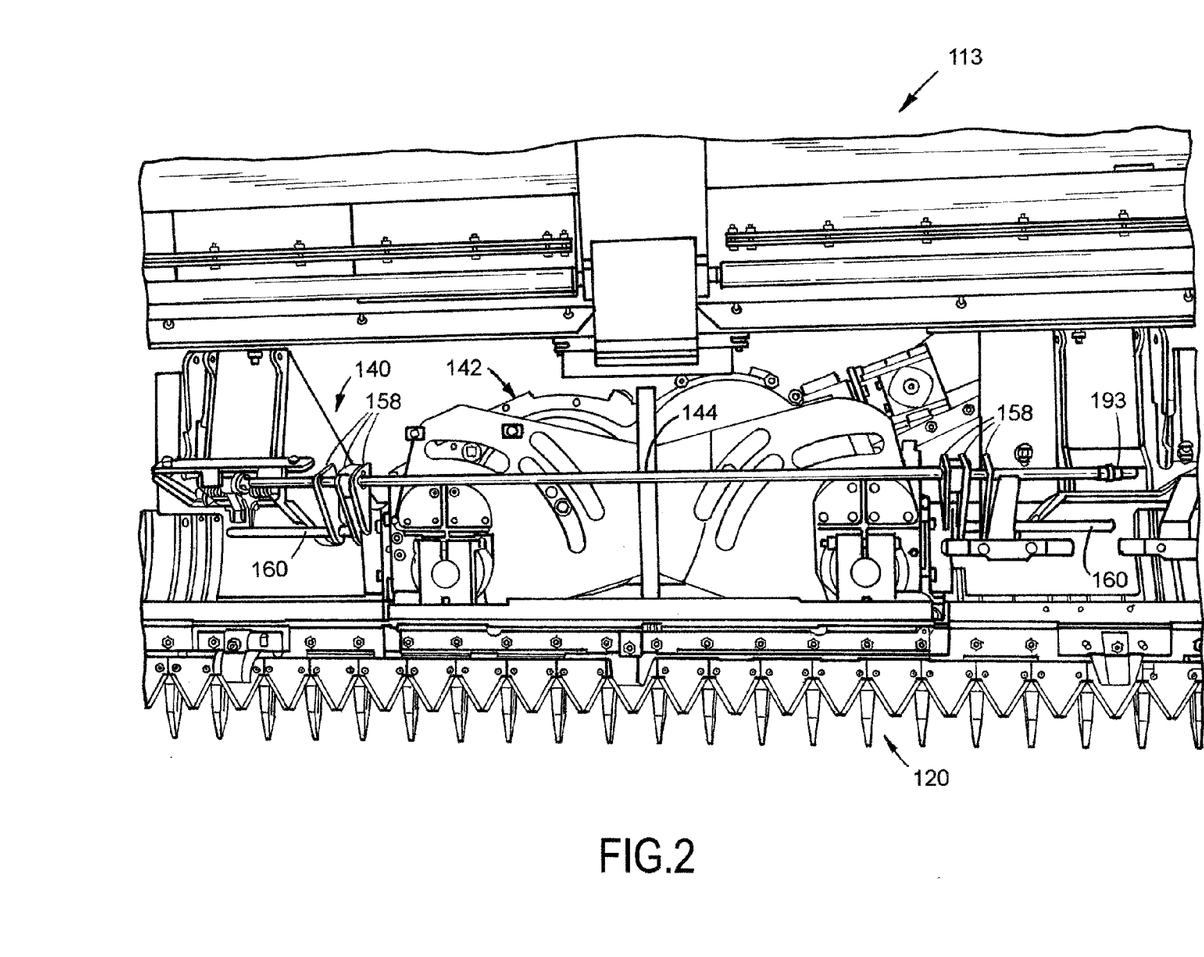
FIG. 2 is a partial top plan view of a cutterbar assembly, a cutterbar knife drive and a portion of a pneumatic knife drive cleaning apparatus according to an aspect of the subject application.
Figure 6:
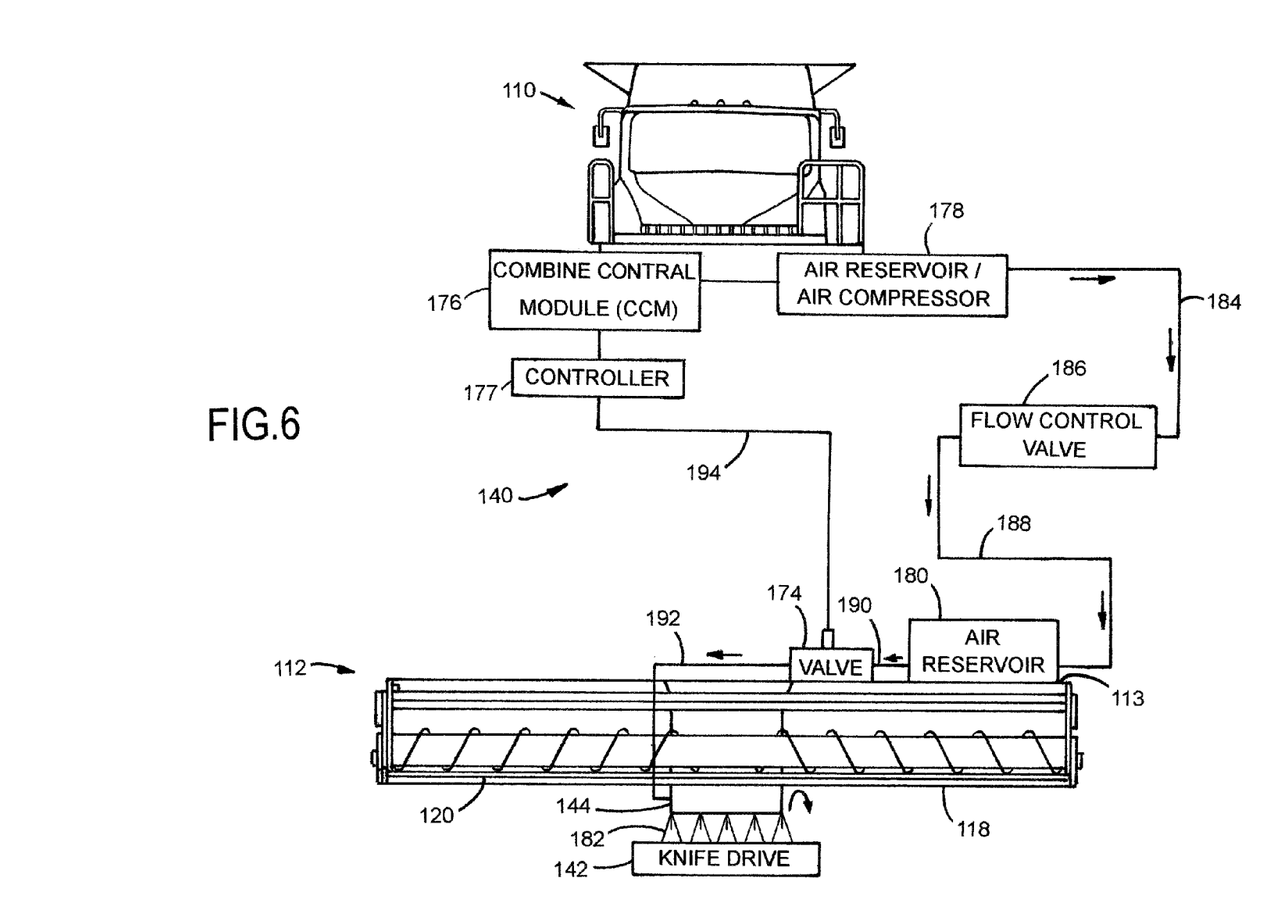
FIG. 6 is a schematic view of an agricultural harvester, header and pneumatic knife drive cleaning apparatus according to an aspect of the subject application.

Referring to FIGS. 2 and 6 in combination there is partially shown in FIG. 6 an agricultural harvester or combine 110 including a header 112 and a header chassis 113 according the subject application. Additionally, FIG. 6 schematically illustrates apparatus 140 for cleaning a knife drive 142 of the header. As seen in FIG. 6, the knife drive is situated beneath a header floor 118 and an apertured pressurized air dispensing conduit 144. Apparatus 140, including apertured conduit 144 and other features, is described in detail below.

FIG. 2 expands on FIG. 6 by revealing in a top plan view a portion of a header chassis 113 which is attachable to agricultural harvester 110. FIG. 2 also shows a cutterbar assembly 120 and a pneumatic knife drive cleaning apparatus or system 140 according to an aspect of the subject application for cleaning a knife drive of header 112. Not illustrated in FIG. 2 but shown and later described in detail in connection with FIG. 6 is at least one source of pressurized air that supplies compressed air to the knife drive cleaning apparatus 140. As seen in FIG. 2, header chassis 113 carries knife drive 142 which is mounted rearwardly of and drivingly connected to cutterbar assembly 120. Knife drive cleaning apparatus 140 includes conduit 144 for discharging pressurized air toward the knife drive 142. Conduit 144 is disposed proximate the knife drive 142 and rearwardly of the cutterbar assembly. According to an aspect, conduit 144 is disposed directly above the knife drive 142 and the knife drive and cutterbar assembly are carried by flex arms as further discussed below.

Figure 3:
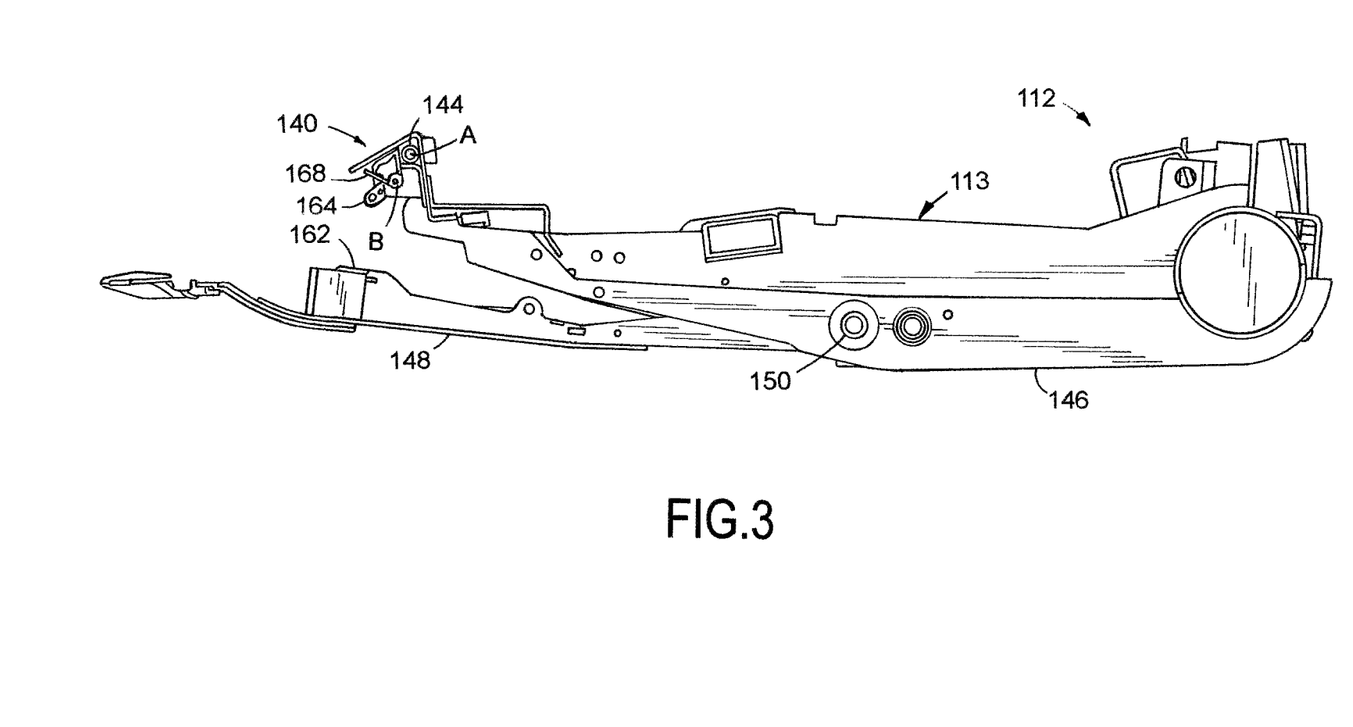
FIG. 3 is a side elevation view of the header chassis, the flex arm and a portion of the pneumatic knife drive cleaning apparatus of FIG. 2.

FIG. 3 illustrates in side elevation view certain features of header 112. In particular, as seen in FIG. 3 header 112 comprises a chassis 113 including a forwardly extending profile member 146. A cutterbar support arm or flex arm 148 extends from the header chassis and is pivotably attached at its proximal end to profile member 146 at pivot 150. By virtue of the pivoted connection of the flex arm 148 to the header chassis, the cutterbar 120 and the knife drive 142 (FIG. 2) follow the contours the field being harvested including depressions, mounds, slopes and other variations in terrain. The flex arm 148 thus extends from the header chassis 113 and is movable between a first position (e.g., as shown in FIG. 3) and a second position via pivot 150. Further, the conduit 144 is disposed proximate the knife drive whereby the conduit is operatively connected to the flex arm to move between first and second positions in response to the flex arm moving between its first and second positions. Flex arm 148 is part of pneumatic knife drive cleaning apparatus or system 140.

According to an aspect, movement of flex arm 148 results in corresponding movement of the conduit whereby the knife drive is swept with a curtain of pressurized air in order to dislodge and disperse soil, dust, crop material and other debris that may collect on the knife as the agricultural harvester traverses a field being harvested. As will be more fully appreciated by reference to FIGS. 5 and 5A, discussed below, the air curtain may be produced by a single elongated slit or opening provided in apertured conduit 144 or by a plurality of openings spaced along the length of the conduit 144. If conduit 144 is provided with a single elongated slit, the pressurized air discharged in a continuous line thereby forming a continuous air curtain that contacts the knife dive 142. In the alternative, if conduit 144 is provided with a plurality of openings, the distances between and diameters of the openings are selected such that the substantially fan-shaped or conical air patterns discharged from the openings overlap where they contact the knife drive 142 in order to provide continuous coverage of the knife drive with pressurized air, e.g., a curtain of air, as the conduit 144 is moved relative to the knife drive.

Apertured conduit 144 is also connected to the cutterbar support arm or flex arm 148 in such a way that the conduit is configured to rotate or pivot about an axis "A" i.e., move between first and second positions, as the flex arm 148 pivots relative to the header chassis 113 between first and second positions. So constructed and arranged, the conduit sweeps the air curtain, e.g., provides a sweeping flow of pressurized air, across the top surface of the knife drive as the agricultural harvester moves over a field in a harvesting mode.

Figure 4:
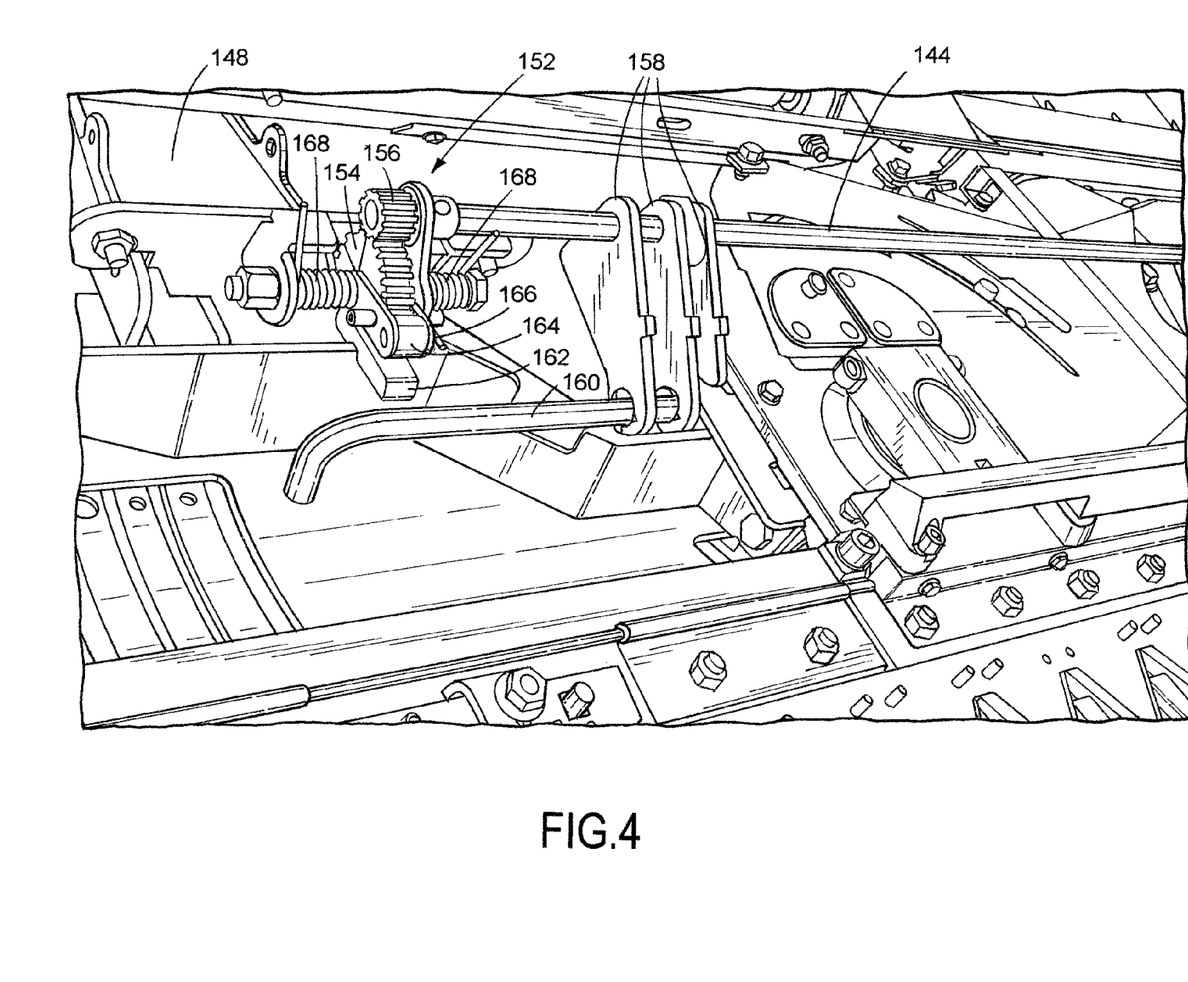
FIG. 4 is an enlarged top perspective view of a portion of the pneumatic knife drive cleaning apparatus of FIG. 2.

Referring to FIG. 4, there is shown an aspect of the pneumatic knife drive cleaning system 140 including a conduit drive mechanism 152 which is carried by the header 112. The conduit drive mechanism is operable to move the conduit 144 relative to the knife drive 142 between its first and second positions in response to contact by the flex arm 148. Specifically, conduit drive mechanism 152 includes cooperating members 154, 156 that are operable to rotate the conduit 144. In accordance with an aspect, member 154 rotates member 156 the latter of which is carried by the conduit. As discussed below, a drive member carried by the flex arm 148 is operable to contact a cam carried by one of the cooperating members, wherein contact by the drive member with the cam causes rotation of the cooperating members and the conduit 144. Cooperating members 154, 156 may be spur gears or they may assume any form in which member 154 may suitably drive member 156 including, without limitation, cooperating high-friction surfaces provided at the peripheries of rubberized discs or the like.

Referring to FIGS. 2 and 4, it is shown that the apertured conduit 144 can be supported for rotation by spaced apart brackets 158 that are fixed to the header chassis 113 such as by bars 160 or the like. Referring to FIGS. 3 and 4, there is shown an exemplary but non-limitative mechanism by which member 154 rotates member 156. In particular, the distal end of flex arm or cutterbar supporting arm 148 carries a strike plate or similar drive member 162 which is operable to contact a cam 164 carried by rotating member 154. Thus, by virtue of rotating member 154, the conduit 144 includes a cam for camming against a drive member connected to the cutterbar supporting arm. According to an aspect, cam 164 can be a roller carried by a bracket 166 that is fixedly connected to rotating member 154. Thus, contact by drive member 162 with cam 164 causes the bracket 166 and member 154 to rotate in unison thereby rotating member 156 and conduit 144. Additionally, conduit drive mechanism 152 can include one or more biasing members 168 such as torsion springs or the like disposed about a rotation axis "B" of rotating member 154 which are adapted to bias cam 164 toward a downward position toward drive member 162. Constructed and arranged as such, movement of the flex arm or cutterbar supporting arm 148 due to floating over the ground surface causes drive member 162 to alternately engage and disengage with cam 164. In so doing, rotating member 154 is caused to rotate thereby rotating member 156 against the force of biasing member(s) 168 and causing the apertured conduit 144 to discharge pressurized air in a sweeping fashion across the top surface of the knife drive 142.

Figure 5:
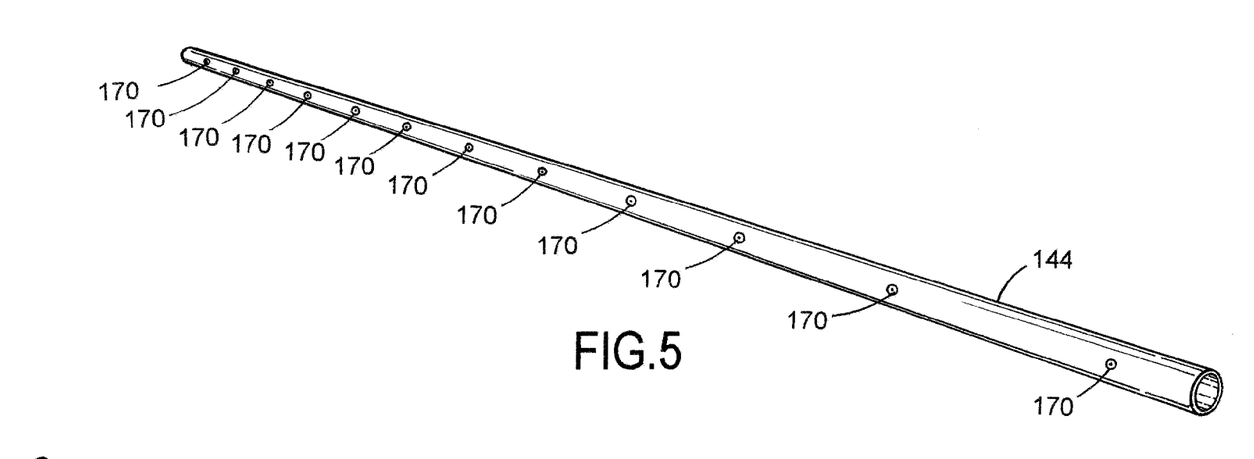
FIG. 5 is a perspective view of an apertured knife drive cleaning conduit according to an aspect of the subject application.
Figure 5A:
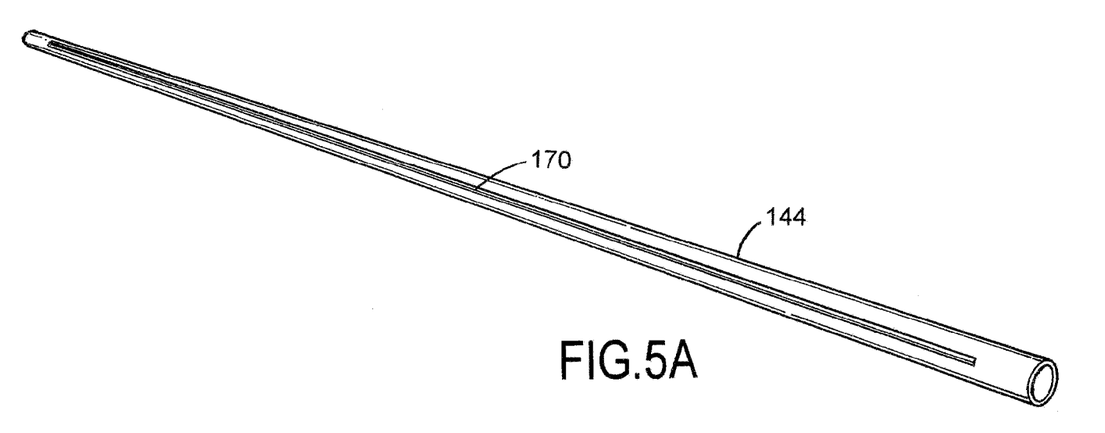
FIG. 5A is a perspective view of an apertured knife drive cleaning conduit according to another aspect of the subject application.

FIGS. 5 and 5A respectively reveal in perspective view representative apertured conduits 144, 144' according to the subject application. The conduits 144, 144' are rigid hollow tubes formed from metal or plastic and have at least one opening provided therein for discharging a curtain of pressurized air toward the header knife drive. According to an aspect shown in FIG. 5A, the at least one opening can be an elongated opening or slit 170' extending along the length of the conduit. Alternatively, as illustrated in FIG. 5, the at least one opening may comprise a plurality of spaced apart openings 170 extending along the length of the conduit. The length and diameter of conduit 144 as well as the number of and size of the openings 170 provided therein may vary according to the dimensions and debris clearing needs of the header. In particular, the spaced apart openings 170 are configured to have spacing and sizing sufficient to produce a uniform curtain of air. By way of example and not limitation, conduit 144 may range from about 10 mm to about 20 mm in diameter and preferably about 16 mm in diameter, about 100 mm to about 300 mm in length and preferably about 200 mm in length, and have from about 3 to about 24 openings and preferably about 12 openings, each opening having a diameter from about 1.0 mm to about 2.0 mm in diameter and preferably about 1.5 mm in diameter. According to an exemplary embodiment, conduit 144 may be about 16 mm in diameter, about 200 mm in length and have twelve 1.5 mm diameter openings 170 provided therein.

Referring to FIG. 6, it is shown that the pneumatic knife drive cleaning apparatus 140 includes at least one source of pressurized air carried by one or both of the harvester 110 and the header 112. Header 112 also includes a valve 174 operatively connected to the conduit 144 and a valve actuator 176 carried by the header or the harvester 110. The valve actuator includes a controller 177 on which a duty cycle is programmed. The controller is operable to open the valve 174 during an active state of the duty cycle and to close the valve during an inactive state of the duty cycle.

As illustrated in FIG. 6, first and second sources of pressurized air are provided which are in fluid communication with one another. More particularly, a first source of pressurized air can be an air reservoir/air compressor combination 178 carried by the harvester 110 and a second source of pressurized air can be an air reservoir 180 carried by the chassis or frame 113 of header 112. Although shown as being two sources of pressurized air respectively carried by the harvester and the header, it is contemplated that a single source of pressurized air may be carried by either the harvester or the header. For example, the second source of pressurized air 180 can be eliminated and the first source of pressurized air 178 can be carried by the header 112. However, it will be understood that the air compressor which generates pressurized air is driven by a power take off (PTO) directly or indirectly connected to the engine of the harvester 110 via pulleys and belts, sprockets and chains or a combination thereof. Such PTOs are known in the art and a further detailed description of their structure, function and operation is not necessary for a complete understanding of the subject application.

Valve 174 can be e.g., a two-way valve which is in fluid communication with the source(s) of pressurized air and controls flow of pressurized air from the pressurized air source(s) to apertured conduit 144 and operatively connected to and in communication with controller 177. Conduit 144 is disposed proximate and above the knife drive 142 generally parallel to the direction of cutterbar 120 of the header 112. Conduit 144 discharges a curtain of pressurized air 182 toward the knife drive in order to remove dirt, debris, crop material and other unwanted matter from the knife drive during operation of the harvester. The air curtain 182 impinges upon a substantial portion of the knife drive 142 for thorough cleaning of the knife drive structure during operation of harvester 110.

Referring still to FIG. 6 and as noted above, a first pressurized air source 178 can be carried by the harvester 110 or the header 112. As discussed above, the first pressurized air source can be comprised of a combined air reservoir/air compressor. According to the subject application, the air compressor is contemplated to pressurize air to a range sufficient to adequately clean the knife drive 142. The air reservoir portion of the first pressurized air source 178 is optional and is operable to serve as a first chamber for storing pressurized air that is ultimately discharged by conduit 144. According to the aspect of the subject application shown in FIG. 6, the knife drive cleaning apparatus includes a first hose, pipe or similar hollow air delivery line 184 which can feed pressurized air to the input of an optional flow control valve 186. The output of flow control valve 186, in turn, is connected to a second hose, pipe or similar hollow air delivery line 188 which delivers pressurized air to air reservoir 180 which, as noted above, is optional. Pressurized air from line 188 is stored in air reservoir 180 until released by opening of valve 174. A third hose, pipe or similar hollow air delivery line 190 connects air reservoir 180 to valve 174 and a fourth hose, pipe or similar hollow air delivery line 192 connects valve 174 to apertured conduit 144 via fitting 193 (FIG. 2).

According to an aspect of the subject application, valve 174 is an electromechanical valve and the valve actuator 176 is a combine control module (CCM) electrically connected via a controller 177 to the valve 174 by way of a wire harness or other suitable electrical connector 194. In the alternative, valve 174 may be entirely mechanical in operation and the valve actuator 176 may be a knob, button or the like provided in the cab of the harvester 110 that may be manually operated to selectively open and close the valve 174. In the event the valve 174 is electromechanical in operation and the controller 177 is an electronic controller, the controller is programmed with a duty cycle including active and inactive states. That is, the controller 177 is configured to transmit signals to cause the valve 174 to open during an active state of the duty cycle and to close during an inactive state of the duty cycle. According to a non-limitative embodiment, the active state may be about 3 seconds in duration and the inactive state may be about 60 seconds in duration, although the durations of the active and inactive states can be programmed to vary from these times depending on the crop being harvested and other conditions. The duty cycle may be immutably programmed into the controller 177 or may be selectively programmed by the harvester operator using suitable controls provided in the harvester cab to accommodate particular harvesting conditions.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:
1. An agricultural harvester comprising:
a source of pressurized air; and
a header that includes:
  a knife drive mounted in a central portion of the header rearwardly of a cutterbar assembly; and
  a conduit disposed directly above and proximate to the knife drive and rearwardly of the cutterbar assembly, wherein the conduit is in fluid communication with the source of pressurized air and includes at least one opening for discharging pressurized air downward towards the top of the knife drive;
a valve operatively connected to the conduit; and
a valve actuator that includes a controller on which a predetermined duty cycle is programmed, wherein the controller is programmed during harvesting operation to open the valve during an active state of the duty cycle and to close the valve during an inactive state of the duty cycle.

2. The agricultural harvester of claim 1, wherein the header further comprises a movable cutterbar support arm extending from a chassis of the header to the cutterbar, and wherein the conduit is connected to the cutterbar support arm and configured to rotate about an axis changing the position of the opening with respect to the knife drive as the cutterbar support arm pivots relative to the chassis in response to movement of the cutterbar support arm thereby sweeping air across a top surface of the knife drive.

3. The agricultural harvester of claim 1, wherein the conduit includes a plurality of openings forming an air curtain engaging the knife drive.

4. The agricultural harvester of claim 3, wherein the conduit rotates about an axis sweeping the air curtain across a top surface of the knife drive.

5. The agricultural harvester of claim 1, further comprising:
a bracket fixed to a chassis of the header for rotatably supporting the conduit;
cooperating members associated with the conduit and the chassis operable to rotate the conduit;
a cutterbar support arm extending from the header chassis;
a drive member carried by the cutterbar support arm and operable to contact a cam carried by one of the cooperating members, wherein contact by the drive member with the cam causes rotation of the cooperating members and the conduit; and a biasing member operable to bias the cam toward a downward position.

6. A header for an agricultural harvester comprising:
a chassis and a flex arm that supports a cutterbar of a knife drive extending from the chassis movable between a first position and a second position; and
a conduit disposed proximate the knife drive, the conduit including at least one opening for discharging pressurized air toward the knife drive, wherein the conduit is operatively connected to the flex arm to move between first and second positions in response to the flex arm moving between its first and second positions, wherein an orientation of the opening with respect to the knife drive changes during movement between the first and second positions of the conduit.

7. The header of claim 6, wherein the conduit rotates about an axis as it moves between the first and second positions.

8. The header of claim 6, wherein the conduit is positioned directly above the knife drive.

9. The header of claim 6, wherein the conduit includes a plurality of spaced apart openings discharging a curtain of air toward the knife drive.

10. The header of claim 6, wherein the at least one opening is an elongated opening for discharging a curtain of air toward the knife drive.

11. The header of claim 6, further comprising:
a valve operatively connected to the conduit; and
a valve actuator that includes a controller on which a duty cycle is programmed, wherein the controller is operable to open the valve during an active state of the duty cycle and to close the valve during an inactive state of the duty cycle, wherein the inactive state is longer than the active state.

12. A header for an agricultural harvester comprising:
a chassis and a flex arm extending from the chassis movable between a first position and a second position;
a knife drive supported by the chassis; and
a conduit disposed proximate the knife drive, the conduit including at least one opening for discharging pressurized air toward the knife drive, wherein the conduit is operatively connected to the flex arm to move between first and second positions in response to the flex arm moving between its first and second positions;
a bracket fixed to the chassis for rotatably supporting the conduit;
cooperating members associated with the conduit and the chassis operable to rotate the conduit;
a drive member carried by the flex arm and operable to contact a cam carried by one of the cooperating members, wherein contact by the drive member with the cam causes rotation of the cooperating members and the conduit; and
a biasing member operable to bias the cam toward a downward position.

13. Apparatus for cleaning a knife drive of a header for an agricultural harvester, wherein the header includes a chassis and a cutterbar supporting arm movably connected to the chassis, the apparatus comprising:
a pressurized air source carried by at least one of the header and the agricultural harvester; and
a conduit disposed proximate the knife drive, wherein the conduit is in fluid communication with the pressurized air source and includes an opening for discharging a curtain of air toward the knife drive, and wherein the conduit is configured to pivot about an axis in response to movement of the cutterbar supporting arm thereby sweeping the curtain of air across a top surface of the knife drive.

14. The apparatus of claim 13, further comprising:
a valve operatively connected to the conduit; and
a valve actuator that includes a controller on which a duty cycle is programmed, wherein the controller is operable to open the valve during an active state of the duty cycle and to close the valve during an inactive state of the duty cycle.

15. The apparatus of claim 13, wherein the conduit further comprises a cam for camming against a drive member connected to the cutterbar supporting arm.

16. The apparatus of claim 13, further comprising:
a bracket fixed to the chassis for rotatably supporting the conduit;
cooperating members associated with the conduit and the chassis operable to rotate the conduit;
a drive member carried by the cutterbar supporting arm and operable to contact a cam carried by one of the cooperating members, wherein contact by the drive member with the cam causes rotation of the conduit; and
a biasing member operable to bias the cam toward a downward position.

17. A method for clearing debris from a knife drive of a header for an agricultural harvester, wherein the header includes a chassis and a cutterbar supporting arm movably connected to the chassis, the method comprising:
providing a sweeping flow of pressurized air across a top surface of the knife drive as the harvester is operated in a harvesting mode;
providing a source of pressurized air for generating the sweeping flow of pressurized air across the top surface of the knife drive;
providing a conduit for delivering pressurized air to the knife drive and generating the sweeping flow of pressurized air;
providing a valve operatively connected to the conduit; and
operating a valve actuator that includes a controller on which a predetermined on off duty cycle is programmed during the harvest mode to open the valve during an active state of the duty cycle and to close the valve during an inactive state of the duty cycle, wherein the inactive state is longer than the active state.

* * * * *